United States Patent
Evans et al.

(10) Patent No.: US 10,910,940 B2
(45) Date of Patent: Feb. 2, 2021

(54) VOLTAGE REGULATOR HAVING A SWITCHABLE ATTENUATION CIRCUIT

(71) Applicant: Lenovo Enterprise Solutions (Singapore) Pte. Ltd., Singapore (SG)

(72) Inventors: Douglas I. Evans, Cary, NC (US); Brian C. Totten, Durham, NC (US); Dipak N. Tailor, Cary, NC (US); Jamaica La Quay Barnette, Durham, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/440,177

(22) Filed: Jun. 13, 2019

(65) Prior Publication Data

US 2020/0395842 A1  Dec. 17, 2020

(51) Int. Cl.
*H02M 1/34* (2007.01)
*H02M 3/158* (2006.01)
*H02M 1/00* (2006.01)

(52) U.S. Cl.
CPC ............. *H02M 1/34* (2013.01); *H02M 3/158* (2013.01); *H02M 3/1584* (2013.01); *H02M 2001/342* (2013.01)

(58) Field of Classification Search
CPC .... H02M 3/158; H02M 1/34; H02M 3/33507; H02M 2001/0058; H02M 1/32; H02M 2001/342; H02M 2001/344; H02M 1/14; H02M 2001/007
See application file for complete search history.

(56) References Cited

U.S. PATENT DOCUMENTS

| | | | | |
|---|---|---|---|---|
| 2002/0057540 A1* | 5/2002 | Ito | ............. | H02M 1/08 361/18 |
| 2005/0226012 A1* | 10/2005 | Jovanovic | ........... | H02M 3/1584 363/59 |
| 2007/0297202 A1* | 12/2007 | Zargari | ............. | H02M 1/08 363/50 |
| 2012/0127762 A1* | 5/2012 | Reddy | ............. | H02M 3/33592 363/21.04 |
| 2013/0049654 A1* | 2/2013 | Kure | ............. | B60L 3/003 318/400.2 |
| 2014/0167720 A1* | 6/2014 | Chiang | ............. | H02M 3/158 323/282 |
| 2015/0364995 A1* | 12/2015 | Chen | ............. | H02M 3/158 323/271 |
| 2015/0381031 A1* | 12/2015 | Ghosh | ............. | H02M 1/34 363/21.12 |
| 2016/0036313 A1* | 2/2016 | Li | ............. | H02M 1/00 323/271 |

(Continued)

*Primary Examiner* — Gustavo A Rosario-Benitez
(74) *Attorney, Agent, or Firm* — Jeffrey Streets (57) ABSTRACT

An apparatus includes a voltage regulator including a high-side field-effect transistor, a low-side field-effect transistor, an inductor, and a conductive net connecting the high-side field-effect transistor, the low-side field-effect transistor and the inductor. The apparatus further includes an attenuation circuit coupled to the conductive net, wherein the attenuation circuit includes an electronic switch that enables and disables an amount of attenuation provided by the attenuation circuit. Examples of the attenuation circuit include a snubber circuit and a boost resistor circuit.

19 Claims, 7 Drawing Sheets

(56) References Cited

U.S. PATENT DOCUMENTS

| | | | |
|---|---|---|---|
| 2016/0072393 A1* | 3/2016 | McIntyre | H02M 3/1582 363/21.1 |
| 2016/0277017 A1* | 9/2016 | Lin | H01L 23/49589 |
| 2017/0040770 A1* | 2/2017 | Gyoten | H01S 5/4025 |
| 2017/0257022 A1* | 9/2017 | Bryant | H02M 5/04 |
| 2018/0019672 A1* | 1/2018 | Luo | H02M 3/158 |
| 2018/0323777 A1* | 11/2018 | Vershinin | H03K 17/105 |

\* cited by examiner

VOLTAGE REGULATOR HAVING A SWITCHABLE ATTENUATION CIRCUIT

BACKGROUND

The present disclosure relates to a circuit that may be used to attenuate ringing that can occur in a voltage regulator circuit.

BACKGROUND OF THE RELATED ART

A voltage regulator is a system that receives an input voltage and provides an output voltage at a constant level. A voltage regulator may include a high-side field-effect transistor (FET), a low-side FET and an inductor, which are each connected to a net referred to as the "switch node". When the high-side FET is turned on, the switch node may ring above the input voltage. To attenuate this ringing, the voltage regulator may include an additional circuit that suppresses a rapid rise in the voltage within the switch node.

BRIEF SUMMARY

Some embodiments provide an apparatus including a voltage regulator including a high-side field-effect transistor, a low-side field-effect transistor, an inductor, and a conductive net connecting the high-side field-effect transistor, the low-side field-effect transistor and the inductor. The apparatus further includes an attenuation circuit coupled to the conductive net, wherein the attenuation circuit includes an electronic switch that enables and disables an amount of attenuation provided by the attenuation circuit.

Some embodiments provide an apparatus comprising a voltage regulator including a plurality of phases, each phase including a high-side field-effect transistor, a low-side field-effect transistor, and a switchable snubber circuit connected across a field-effect transistor selected from the low-side field-effect transistor and the high-side field-effect transistor, wherein each switchable snubber circuit includes an electronic switch. The apparatus further comprises a multi-phase controller in communication with a gate of the high-side field-effect transistor of each phase, a gate of the low-side field-effect transistor of each phase, and the electronic switch in the switchable snubber circuit of each phase.

Some embodiments provide an apparatus comprising a voltage regulator including a plurality of phases, each phase including a high-side field-effect transistor, a low-side field-effect transistor, and a switchable snubber circuit connected across a field-effect transistor selected from the low-side field-effect transistor and the high-side field-effect transistor, wherein each switchable snubber circuit includes an electronic switch. The apparatus further comprises a plurality of local-phase controllers, wherein each local-phase controller is in communication with a gate of the high-side field-effect transistor of each phase, a gate of the low-side field-effect transistor of each phase, and the electronic switch in the switchable snubber circuit of each phase. Still further, the apparatus comprises a multi-phase controller in communication with each local-phase controller for providing a separate pulse-width modulation signal to each local-phase controller.

DETAILED DESCRIPTION

Some embodiments provide an apparatus including a voltage regulator including a high-side field-effect transistor, a low-side field-effect transistor, an inductor, and a conductive net connecting the high-side field-effect transistor, the low-side field-effect transistor and the inductor. The apparatus further includes an attenuation circuit coupled to the conductive net, wherein the attenuation circuit includes an electronic switch that enables and disables an amount of attenuation provided by the attenuation circuit. For example, the electronic switch may be selected from a field-effect transistor, a bipolar junction transistor, and an insulated-gate bipolar transistor.

Some embodiments reduce or eliminate power dissipation within the attenuation circuit over a portion of the load range of the voltage regulator. Embodiment of the voltage regulator may turn on a switchable circuit when needed to attenuate ringing in the switch node of the voltage regulator. For example, the snubber circuit may be an RC snubber circuit having a resistor and capacitor in series, but other types of snubber circuits may also be used. Maintaining the snubber circuit in an off condition during much of the voltage regulator's operation, eliminates power loss within the snubber circuit over a portion of the voltage regulator's efficiency curve. The output current of the voltage regulator or the maximum voltage spikes in a switch node of the voltage regulator is measured and input to a controller that turns on the switchable circuit on in response to the selected current or voltage exceeding a setpoint or threshold value.

A non-limiting example of a voltage regulator is referred to as a buck converter. A buck converter includes an inductor connected to a conductive net between the high-side field-effect transistor and the low-side field-effect transistor. However, the switchable snubber circuit may be used with a beneficial power saving effect in any type of voltage regulator that may use a snubber circuit to attenuate ringing. As used herein, the terms "regulator" and "converter" are used interchangeably and are intended to be synonymous for the purpose of the disclosed embodiments.

Some embodiments of the apparatus may further include a controller having a first output in communication with a gate of the high-side field-effect transistor, a second output in communication with a gate of the low-side field-effect transistor, and a third output in communication with the electronic switch of the switchable snubber circuit. The controller sends a first signal to the gate of the high-side field-effect transistor and a second signal to the gate of the low-side field-effect transistor in order to control the output voltage of the voltage regulator.

The electronic switch of the switchable snubber circuit may be controlled to turn on the switch in order to attenuate ringing in the conductive net (i.e., the switch node) of the voltage regulator. In one option, the apparatus may include a voltage comparator having a voltage input connected to the conductive net between the high-side field-effect transistor and the low-side field-effect transistor, wherein the voltage comparator has a voltage output in communication with an input to the controller. Accordingly, the controller may turn on the electronic switch of the switchable snubber circuit in response to the voltage signal output exceeding a voltage setpoint. Specifically, the controller may maintain the electronic switch of the switchable snubber circuit in an off condition unless or until the voltage signal output exceeds the voltage setpoint. In another option, the apparatus may include a current sense circuit disposed to measure an output current of the voltage regulator and provide the measured output current to an input of the controller, wherein the controller turns on the electronic switch of the switchable snubber circuit in response to the measured output current exceeding a current setpoint. For example, where the voltage regulator further includes an inductor connected between an output of the voltage regulator and a conductive net between the high-side field-effect transistor and the low-side field-effect transistor, the current sense circuit may be a DCR current sense circuit connected across the inductor. In regard to either option, there is no current passing through the switchable snubber circuit when the electronic switch of the switchable snubber circuit turned off, such that the switchable snubber circuit does not dissipate power. The switchable snubber circuit will only dissipate power and attenuate ringing in the switch node when the electronic switch of the switchable snubber circuit is turned on.

In some embodiments, the apparatus may further include a second switchable snubber circuit connected in parallel with the switchable snubber circuit, wherein the second switchable snubber circuit includes a resistor, a capacitor, and an electronic switch, and wherein the controller has a fourth output in communication with the electronic switch of the second switchable snubber circuit. The second switchable snubber circuit may be turned on in response to a voltage signal output exceeding a second voltage setpoint or the measured output current exceeding a second current setpoint. Optionally, the second voltage setpoint may be greater than the (first) voltage setpoint or the second current setpoint may be greater than the (first) current setpoint, such that the second switchable snubber circuit is only turned on after the (first) switchable snubber circuit has been turned on and only if the (first) switchable snubber circuit has not provided sufficient attenuation to prevent the voltage signal output or the measured output current from reaching the second voltage setpoint or second current setpoint, respectively.

Some embodiments provide an apparatus comprising a voltage regulator including a plurality of phases. Each phase includes a high-side field-effect transistor, a low-side field-effect transistor, and a switchable snubber circuit connected across a field-effect transistor selected from the low-side field-effect transistor and the high-side field-effect transistor, wherein each switchable snubber circuit includes an electronic switch. The apparatus further comprises a multi-phase controller in communication with a gate of the high-side field-effect transistor of each phase, a gate of the low-side field-effect transistor of each phase, and the electronic switch in the switchable snubber circuit of each phase. In certain non-limiting embodiments, each phase may include a local-phase controller, and the multi-phase controller may provide a separate pulse-width modulation signal to each local phase controller.

Each phase may optionally further include a voltage comparator having a voltage input connected to a conductive net between the high-side field-effect transistor and the low-side field-effect transistor of the phase. The voltage comparator may have a voltage output in communication with an input to the multi-phase controller. Accordingly, the multi-phase controller may turn on the electronic switch in the switchable snubber circuit of the phase in response to the voltage output from the voltage comparator of the phase exceeding a voltage setpoint.

Each phase may optionally further include a current sense circuit disposed to measure an output current of the phase and provide the measured output current to an input of the multi-phase controller. Accordingly, the multi-phase controller may turn on the electronic switch in the switchable snubber circuit of the phase in response to the measured output current from the current sense circuit of the phase exceeding a current setpoint.

Some embodiments provide an apparatus comprising a voltage regulator including a plurality of phases. Each phase includes a high-side field-effect transistor, a low-side field-effect transistor, and a switchable snubber circuit connected across a field-effect transistor selected from the low-side field-effect transistor and the high-side field-effect transistor, wherein each switchable snubber circuit includes an electronic switch. The apparatus further comprises a plurality of local-phase controllers, wherein each local-phase controller is in communication with a gate of the high-side field-effect transistor of each phase, a gate of the low-side field-effect transistor of each phase, and the electronic switch in the switchable snubber circuit of each phase. Still further, the apparatus comprises a multi-phase controller in communication with each local-phase controller for providing a separate pulse-width modulation signal to each local-phase controller.

Each phase may optionally include a voltage comparator having a voltage input connected to a conductive net between the high-side field-effect transistor and the low-side field-effect transistor of the phase. The voltage comparator of each phase may have a voltage output in communication with an input to the local-phase controller of the phase. The local-phase controller of each phase may turn on the electronic switch of the phase in response to the voltage output from the voltage comparator of the phase exceeding a voltage setpoint.

Each phase may optionally include a current sense circuit disposed to measure an output current of the phase and provide the measured output current to an input of the local-phase controller of the phase. The local-phase controller of each phase may turn on the electronic switch of the phase in response to the measured output current from the current sense circuit of the phase exceeding a current setpoint.

Figure 1:
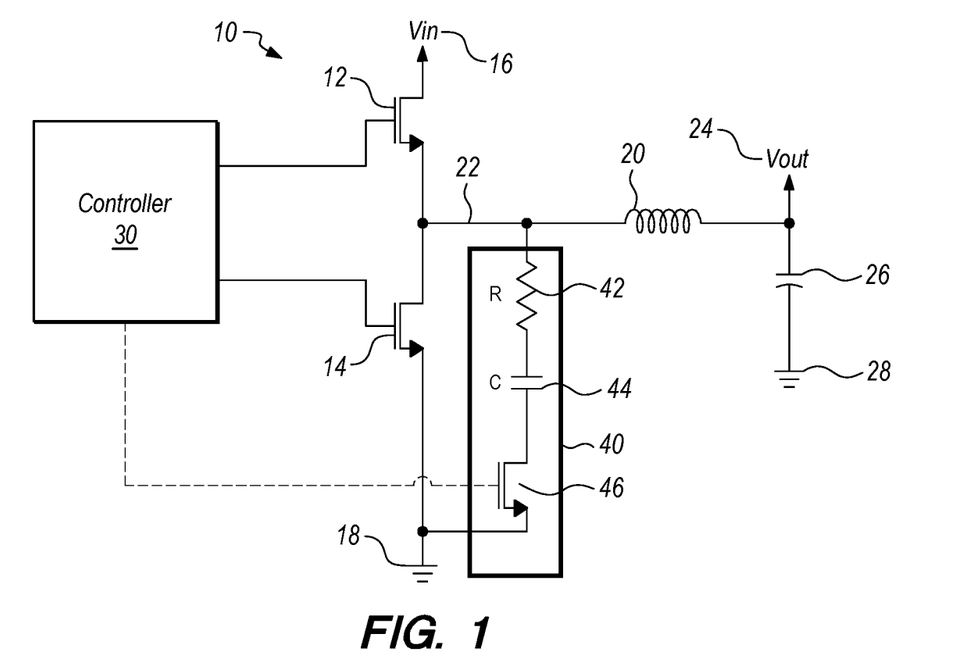
FIG. 1 is a diagram of a single phase buck converter including an attenuation circuit that includes a switchable snubber circuit connected across the low-side field-effect transistor.

FIG. 1 is a diagram of a single phase buck converter 10 including a switchable RC snubber circuit 40 according to one embodiment. The single phase buck converter 10 is just one example of a voltage regulator which includes a high-side field-effect transistor 12 and a low-side field-effect transistor 14 connected in series between a voltage input ($V_{in}$) 16 and ground 18. The single phase buck converter 10 further includes an inductor 20 having a first end connected to a conductive net or switching node 22 between the high-side field-effect transistor 12 and the low-side field-effect transistor 14. A second end of the inductor is connected to a voltage output ($V_{out}$) 24, where a capacitor 26 separates the voltage output 24 from ground 28.

The single phase buck converter 10 further includes a controller 30, such as an integrated circuit or "Control IC", which controls the operation of the field-effect transistors 12, 14. Specifically, the controller 30 has a first output in communication with a gate of the high-side field-effect transistor 12 and a second output in communication with a gate of the low-side field effect transistor 14. For example, the controller 30 may operate field-effect transistors 12, 14 in a manner that provides a desired output voltage level at the voltage output ($V_{out}$) 24.

As shown, the switchable snubber circuit 40 is connected across the low-side field-effect transistor 14. In the example of a switchable RC snubber circuit, the switchable snubber circuit 40 may include a resistor 42, a capacitor 44 and an electronic switch 46. The order of these three components 42, 44, 46 of the switchable RC snubber circuit does not affect the function of the switchable snubber circuit 30. In various embodiments, the electronic switch 46 may be a field-effect transistor (FET), a bipolar junction transistor (BJT) or an insulated-gate bipolar transistor (IGBT). One example of a suitable field-effect transistor is a metal-oxide-semiconductor field-effect transistor (MOSFET). As described herein, the switchable snubber circuit should be considered to be connected across the low-side field-effect transistor even if the grounded end of the snubber is independently connected to ground, although the snubber is preferably connected to the same ground as the low-side field-effect transistor. The effectiveness of the snubber is the greatest when the snubber is positioned and connected physically close to the field-effect transistor.

The controller 30 may include a further output in communication with the electronic switch 46, such that the controller can turn on and turn off the electronic switch 46. When the electronic switch 46 is turned on, the switchable snubber circuit 40 attenuates voltage spikes in the switching node 22. For example, in the case of the switch RC snubber circuit shown in FIG. 1, turning on the electronic switch 46 allows electrical current to flow through resistor 42 and capacitor 44 such that voltage spikes in the switching node 22 are attenuated. However, since a snubber circuit that is turned on will also dissipate power, various embodiments of the controller 30 may keep the switchable snubber circuit 40 turned off unless needed. Where the electronic switch 46 is a field-effect transistor as shown in FIG. 1, the controller 30 may turn the field-effect transistor on and off by controlling the voltage to a gate of the field-effect transistor 46. Although not shown, the voltage regulator 10 may include a driver for each of the field-effect transistors 12, 14. Where the electronic switch 46 is a field-effect transistor, a further driver may be included in association with the electronic switch. Optionally, any of the drivers may be included in the controller 30 or on a circuit board that includes the controller. Accordingly, the drivers are not separately shown. Although FIG. 1 illustrates the buck converter 10, any direct current (DC) converter topology may utilize the switchable snubber circuit 40 to attenuate voltage spikes on a switching node 22.

Figure 2:
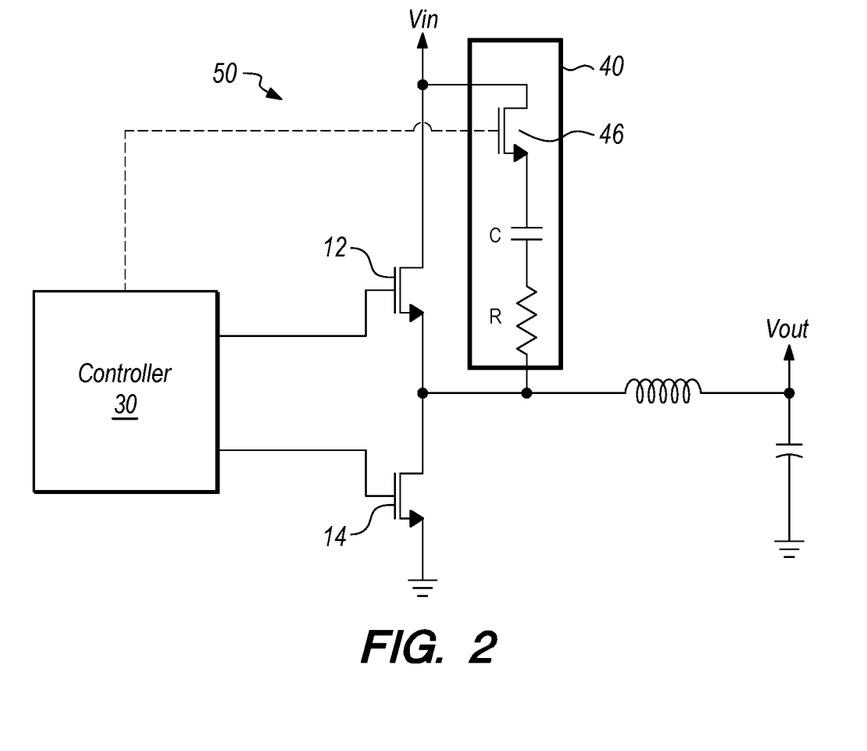
FIG. 2 is a diagram of a single phase buck converter that is similar to that of FIG. 1 except that the switchable snubber circuit is connected across the high-side field-effect transistor.

FIG. 2 is a diagram of a single phase buck converter 50 that is similar to the single phase buck converter 10 of FIG. 1 except that the switchable snubber circuit 40 is connected across the high-side field-effect transistor 12. The operation of the buck converter 50 may be the same or similar to that of the buck converter 10, and the controller 30 may control the field-effect transistors 12, 14, 46 in the same or similar manner as in the buck converter 10.

Figure 3:
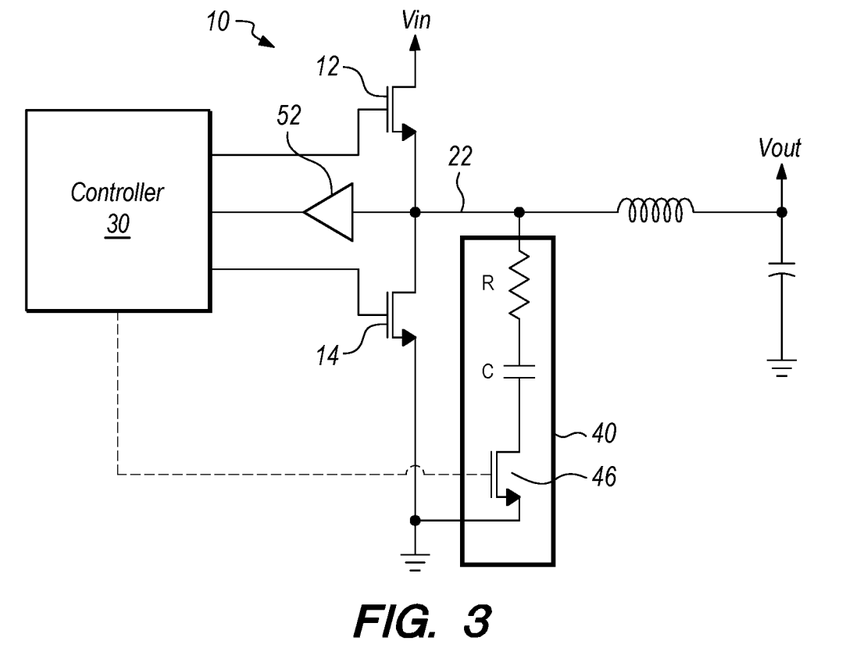
FIG. 3 is a diagram of a single phase buck converter including a switchable snubber circuit and a voltage comparator.

FIG. 3 is a diagram of the single phase buck converter 10 including a switchable snubber circuit 40 and a voltage comparator 52. The voltage comparator 52 has a voltage input connected to the conductive net 22 between the high-side field-effect transistor 12 and the low-side field-effect transistor 14, and also has a voltage output in communication with an input to the controller 30. Accordingly, the controller 30 may monitor the conductive net or switching node 22 for spiking voltage levels and may control the electronic switch 46 of the switchable snubber circuit 40 in response to a sensed voltage level signal from the voltage comparator 52. In one embodiment, the controller may turn on the electronic switch 46 of the switchable snubber circuit 40 in response to the voltage signal output exceeding a voltage setpoint. The controller may optionally maintain the electronic switch of the switchable snubber circuit in an off condition unless the voltage signal output exceeds a voltage setpoint. The switchable snubber circuit 40 preferably does not dissipate power while the electronic switch 46 is turned off.

Figure 4:
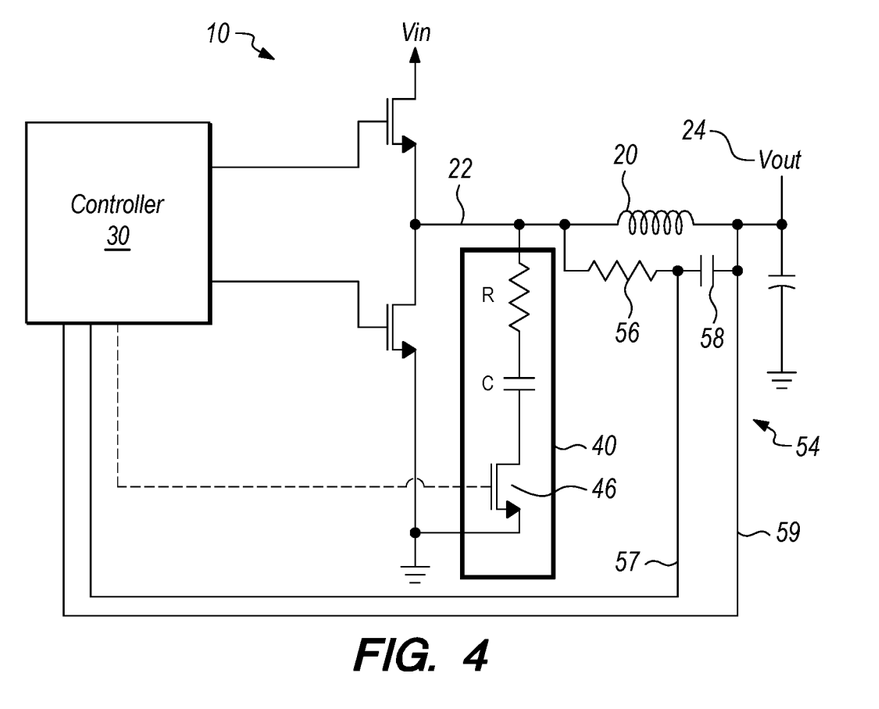
FIG. 4 is a diagram of a buck converter including a switchable snubber circuit and an inductor DCR current sense circuit.

FIG. 4 is a diagram of the single phase buck converter 10 including a switchable snubber circuit 40 and an inductor DCR current sense circuit 54. In this embodiment, the controller 30 may control the electronic switch 46 in response to a sensed amount of output current. The output current may be measured in various manners using various circuits, such as measuring the DC drop across the high-side FET 12 and/or low-side FET 14, using a current mirror in the high-side FET 12, measuring the voltage drop across an external current-sense resistor, and using an inductor DCR (direct current resistance) current sense circuit 54. A current sense circuit is disposed to measure an output current of the voltage regulator 10 and provide the measured output current to an input of the controller 30, such that the controller may control the electronic switch 46 of the switchable snubber circuit 40 in response to the measured output current. For example, the controller 30 may turn on the electronic switch 46 in response to the measured output current exceeding a current setpoint.

The buck converter shown in FIG. 4 includes an inductor 20 that is connected between the voltage output 24 and the conductive net 22. The current sense circuit in FIG. 4 is a DCR current sense circuit that is connected across the inductor 20. The DCR current sense circuit includes a series resistor 56 and a capacitor 58 coupled in parallel across the inductor 20. A pair of current sense leads 57, 59 extend from opposite sides of the capacitor 58 to the controller 30. The signal in the current sense leads 57, 59 to the controller communicates the amount of output current from the output 24 of the buck converter 10.

While the controller 30 may control the electronic switch 46 in response to an output current signal as shown in FIG. 4, the voltage measurement shown in FIG. 3 is believed to be more accurate. However, the controller may control the electronic switch 46 using either a voltage measurement or a current measurement, but does not need both measurements.

Figure 5:
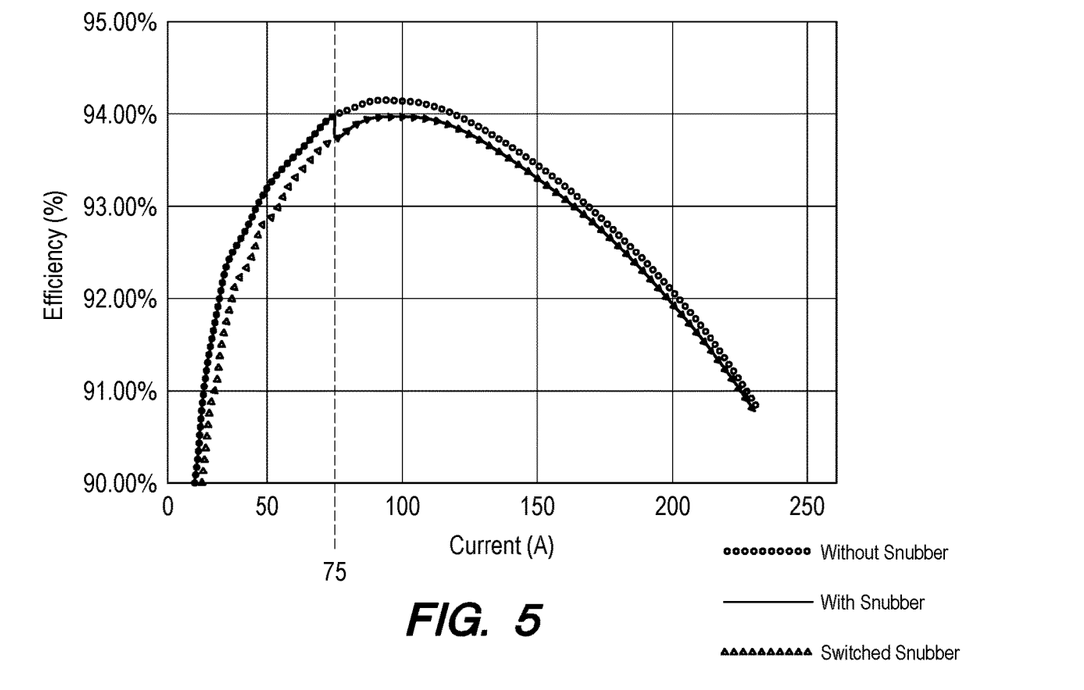
FIG. 5 is a graph of the efficiency as a function of current for a voltage regulator without a snubber circuit, a voltage regulator with a snubber circuit, and a voltage regulator with a switchable snubber circuit.

FIG. 5 is a graph of efficiency as a function of output current for a 5 phase voltage regulator without a snubber circuit, with a snubber circuit and with a switchable snubber circuit, respectively. The switchable RC snubber circuit in each phase was enabled at 15 Amps/phase (75 A total). By leaving the switchable snubber circuit turned off until the voltage regulator reached a current of 75 A, the efficiency curve increases by 0.2-0.3% for much of the curve below 75 A. While beneficial in all voltage regulators, this improvement in voltage regulator efficiency is of particular benefit to a system that needs to maximize battery life, such as a laptop computer, tablet computer, smartphone or other mobile devices. The efficiency curve is representative of efficiency improvements in a voltage regulator having a switchable snubber circuit, regardless of whether the control circuit measures current or voltage.

In reference to FIG. 5, the switchable snubber circuit is turned off at all output current below 75 Amps, such that the efficiency of the voltage regulator is equivalent to a voltage regulator "without a snubber" since the switchable snubber circuit does not dissipate any power. However, if the controller is set to turn on the switchable snubber circuit in response to the output current exceeding 75 Amps, then the efficiency of the voltage regulator is equivalent to a voltage regulator "with a snubber" at all output currents greater than 75 Amps. Accordingly, the efficiency curve for a voltage regulator with a switchable snubber follows the efficiency curve of a voltage regulator without a snubber at output currents less than the output current setpoint of 75 Amps and follows the lower efficiency curve of a voltage regulator with a snubber at output currents greater than the output current setpoint of 75 Amps.

Figure 6:
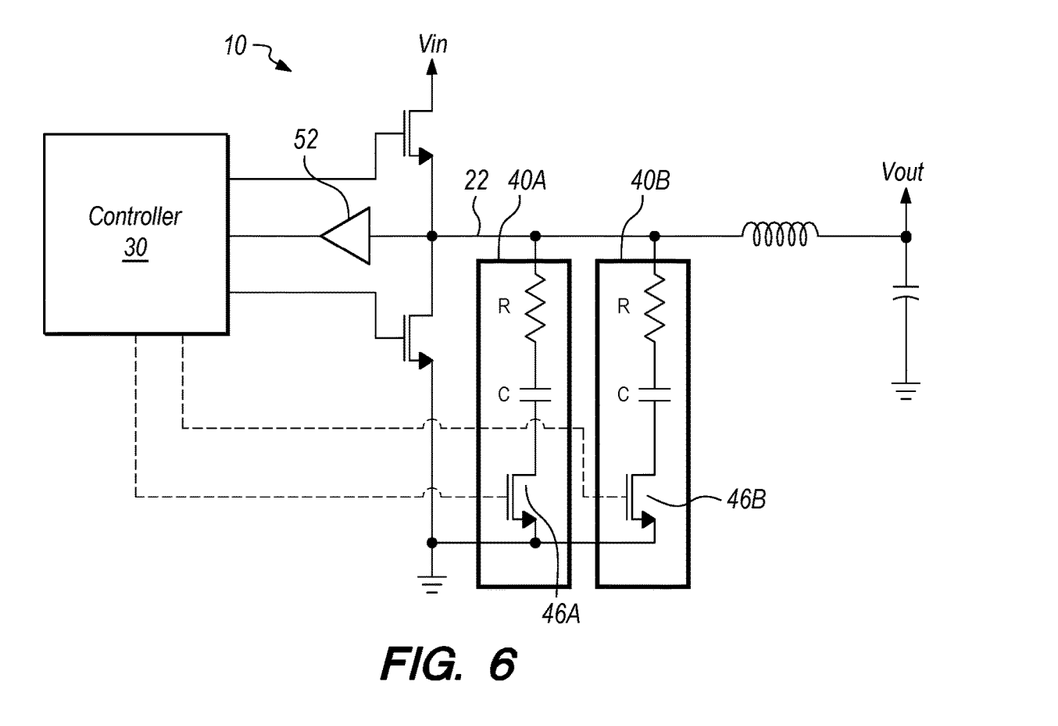
FIG. 6 is a diagram of a buck converter include two independently-controllable switchable snubber circuits in parallel.
Figure 8:
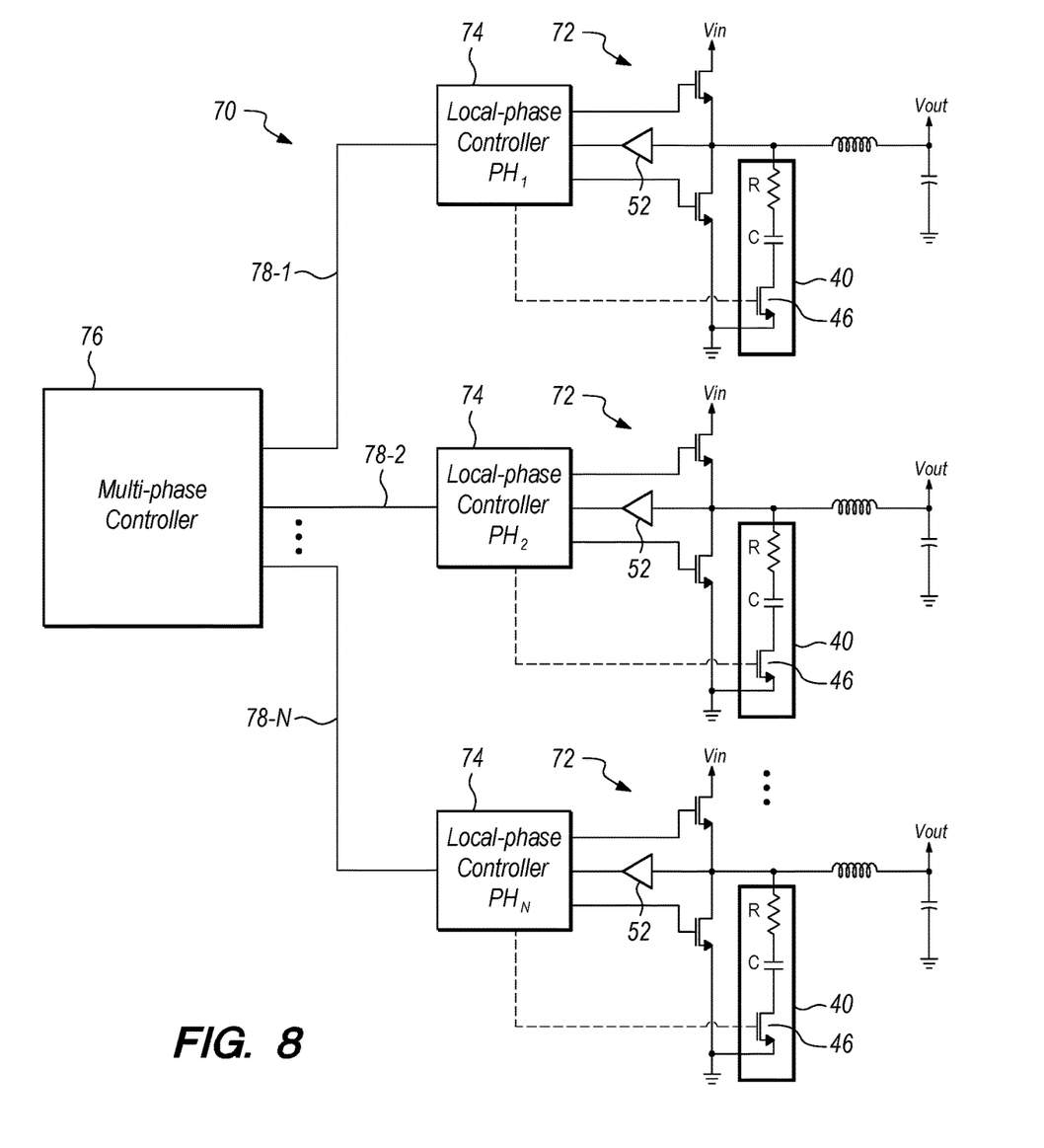
FIG. 8 is a diagram of a multi-phase buck converter including a switchable snubber circuit in each phase, wherein each phase includes a local-phase controller that controls the electronic switch of the snubber circuit.
Figure 9:
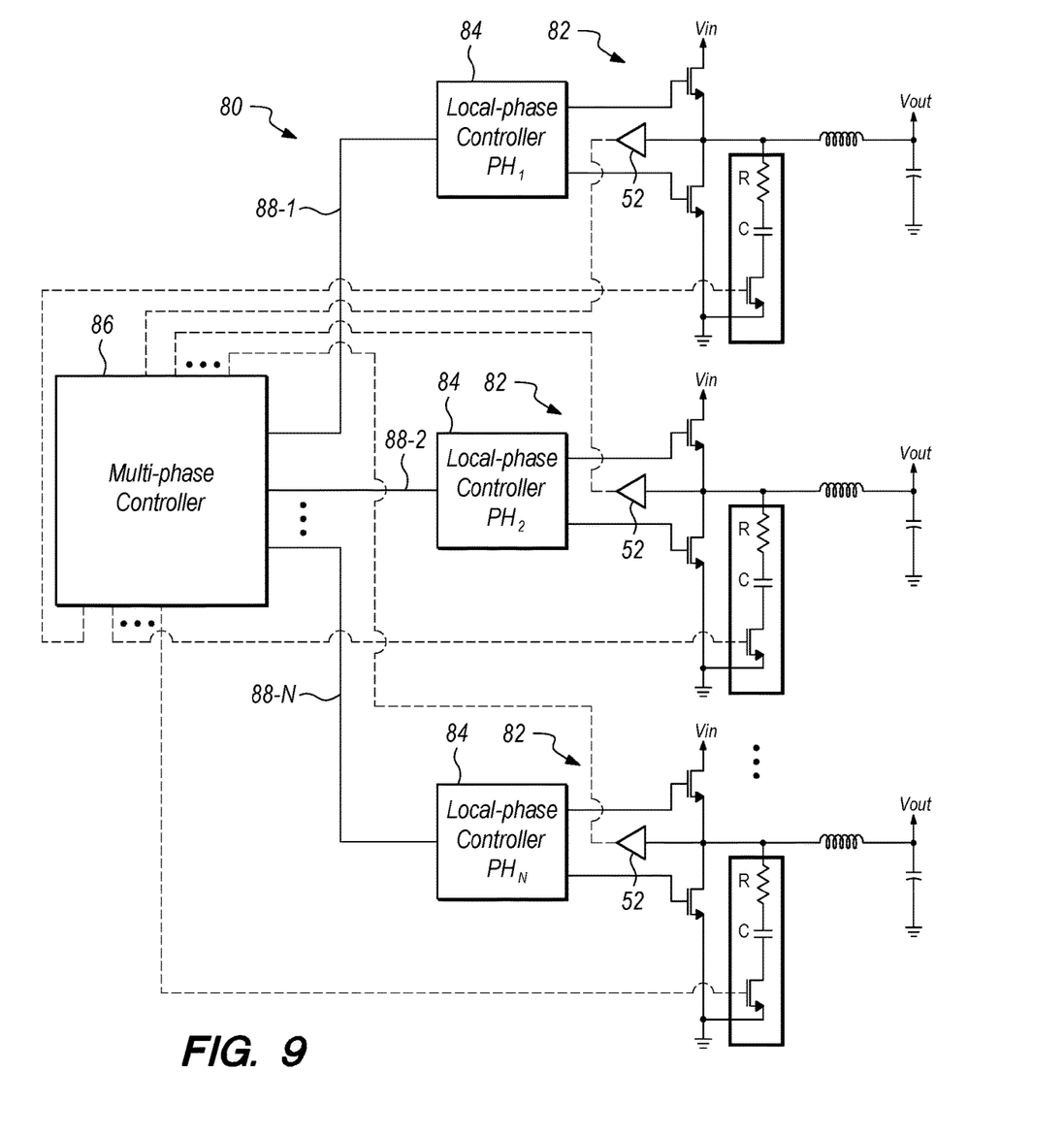
FIG. 9 is a diagram of a multi-phase buck converter including a switchable snubber circuit in each phase, wherein the electronic switch of the snubber circuit in each phase is controlled by a multiphase controller.

FIG. 6 is a diagram of a single phase buck converter 10 including two independently-controllable switchable snubber circuits 40A, 40B in parallel. In this embodiment, the controller 30 may control the electronic switches 46A, 46B to turn on one or more of the switchable snubber circuits 40A, 40B depending on the amount of attenuation desired. For example, the controller 30 may control a first signal to the first electronic switch 46A of the first switchable snubber circuit 40A and may control a second signal to the second electronic switch 46B of the second switchable snubber circuit 40B. The controller 30 may use the first signal to turn on the first electronic switch 46A in response to a voltage signal output from the voltage comparator 52 exceeding a first voltage setpoint and may use the second signal to turn on the second electronic switch 46B in response to the voltage signal output from the voltage comparator 52 exceeding a second voltage setpoint that is greater than the first voltage setpoint. In other words, if voltage spikes or ringing reaches a first level in the conductive net or switching node 22 of the voltage regulator 10, then a first switchable snubber circuit 46A is turned on. However, if the first switchable snubber circuit 40A does not sufficiently attenuate the voltage spikes or ringing, and the voltage spikes or ringing reaches a second level then the second switchable snubber circuit 46B is turned on. The first and second switchable snubber circuits 46A, 46B may be of the same or different types and the components may be characterized by the same or different parameter values, such as resistance and capacitance. In embodiments of a multiphase buck converter as shown in FIGS. 8 and 9, any one or more of the phases may include multiple switchable snubber circuits in parallel.

Figure 7:
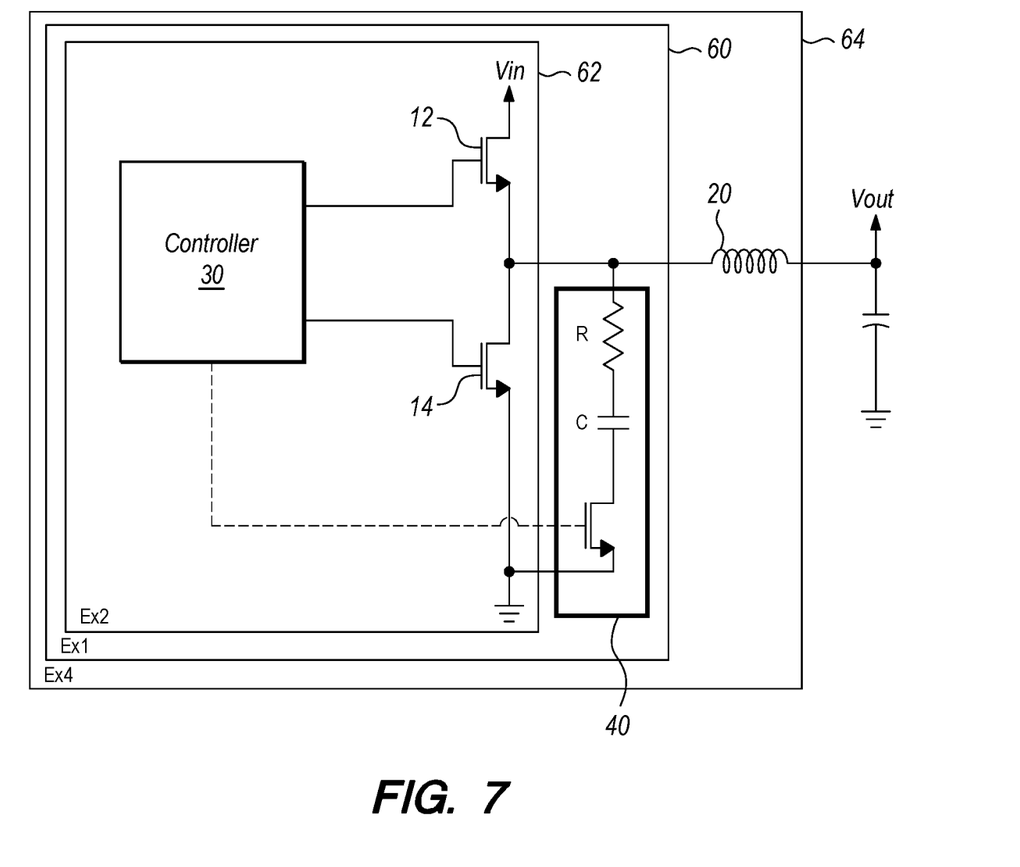
FIG. 7 is a diagram of a buck converter with varying levels of integration.

FIG. 7 is a diagram of the buck converter 10 as shown in FIG. 1, but illustrating varying levels of integration. In one embodiment, the switchable snubber circuit 40 may be provided as a discrete circuit. One embodiment of a discrete switchable snubber circuit includes the resistor (R), capacitor (C), and electronic switch in series. Furthermore, the controller 30, FETs 12, 14 and inductor 20 may each be discrete components, with a current sense signal (see FIG. 4) or voltage sense signal (see FIG. 3) routed back to the controller to determine when to cause the switchable snubber circuit 40 to switch on and off.

In some embodiments, the controller 30, FETs 12, 14, FET drivers (not shown) and switchable snubber circuit 40 may all be integrated in one package 60 as a single phase device. Such an integrated package may be referred to as a point of load integrated circuit (IC). Furthermore, if a voltage comparator is use for voltage sensing as shown in FIG. 3, then even the voltage comparator may be included in the integrated package 60. A particular device that integrates some of the main components of a phase may be referred to as a power stage. An example of a power stage may include a high-side FET, a low-side FET, a pair of drivers and a snubber.

In some embodiments, the controller 30 and FETs 12, 14 may be integrated into a package 62, but the switchable snubber circuit 40 and inductor 20 are external. Accordingly, a voltage sense line as in FIG. 3 may be integrated into the package 62, where a current sense line as in FIG. 4 could be separately connected back to the controller 30 to determine when to turn the switchable snubber circuit 40 on and off.

In some embodiments (not an illustrated example), the switchable snubber circuit 40 could be integrated into a power stage including the FETs 12, 14 and the associated FET drivers. A multi-phase voltage regulator may include a single controller 30 and multiple power stages, such that the controller controls each of the power stages.

In another embodiment, the controller 30, FETs 12, 14, switchable snubber circuit 40 and output inductor 20 may be integrated into one integrated circuit package 64. This integrated circuit package may further integrate either current or voltage sensing circuits. It should be understood that the varying levels of integration are non-limiting example, and any other level or manner of integration may be implemented.

FIG. 8 is a diagram of a multi-phase buck converter 70 including a plurality of phases 72 (phases $PH_1$ to $PH_N$ shown). Each phase 72 includes a buck converter, a switchable snubber circuit 40 and a local-phase controller 74 that controls the electronic switch 46 of the switchable snubber circuit 40. Furthermore, each phase may include a voltage sense line, such as from a voltage comparator 52 as in FIG. 3, or may include a current sense line, such as from the DCR current sense circuit 54 as in FIG. 4. The voltage sense line or the current sense line may be connected back to the local-phase controller 74, such that the local-phase controller may determine when to turn the switchable snubber circuit 40 on and off in response to the signal in the voltage sense line or the current sense line. Optionally, each local-phase controller 74 may include drivers for each of the FETs within the same phase.

The multi-phase voltage regulator 70 may also include a multi-phase controller or integrated circuit (IC) 76 that provides a separate pulse-width modulation (PWM) signal line 78-1 through 78-N to each respective phase. The diagram shows the multi-phase controller 76 and a separate PWM line 78-1 through 78-N extending to the local-phase controller 74 of each phase in order to turn the power stage FETs on and off. For example, the PWM signals may cause one phase to turn on at a time in a sequence, such that only one phase is turned on at any one point in time. Furthermore, each phase of the multi-phase buck converter 70 will experience an increase in power efficiency when the phase is turned on and the switchable snubber circuit 40 is turned off.

FIG. 9 is a diagram of a multi-phase buck converter 80 including a plurality of phases 82 (phases $PH_1$ to $PH_N$ shown). Each phase 82 includes a buck converter and a switchable snubber circuit 40. The multi-phase buck converter 80 further includes a multiphase controller 86 that controls the operation of each phase 82.

The multi-phase controller or integrated circuit (IC) 86 provides a separate pulse-width modulation (PWM) signal line 88-1 through 88-N to the local-phase controller 84 of each phase 82 in order to turn the power stage FETs on and off. For example, the PWM signals may cause one phase to turn on at a time in a sequence, such that only one phase is turned on at any one point in time. The local-phase controllers 84 in this example may simply include drivers for the power stage FETs within the phase.

The voltage comparator 52 in each phase provides the multi-phase controller 86 with a voltage signal that represents the voltage measured locally in the switching node of each phase 82. Accordingly, the multi-phase controller 86 may control the electronic switch 46 in the switchable snubber circuit 40 for each individual phase 82 (i.e., $PH_1 \ldots PH_N$) responsive to the measured voltage. It should be recognized that the voltage comparator 52 that provides a voltage sense output (as shown in FIG. 3) may be replaced with a current sense circuit (such as that shown in FIG. 4). Each phase of the multi-phase buck converter 80 will experience an increase in power efficiency when the phase is turned on and the switchable snubber circuit 40 is turned off.

Figure 10:
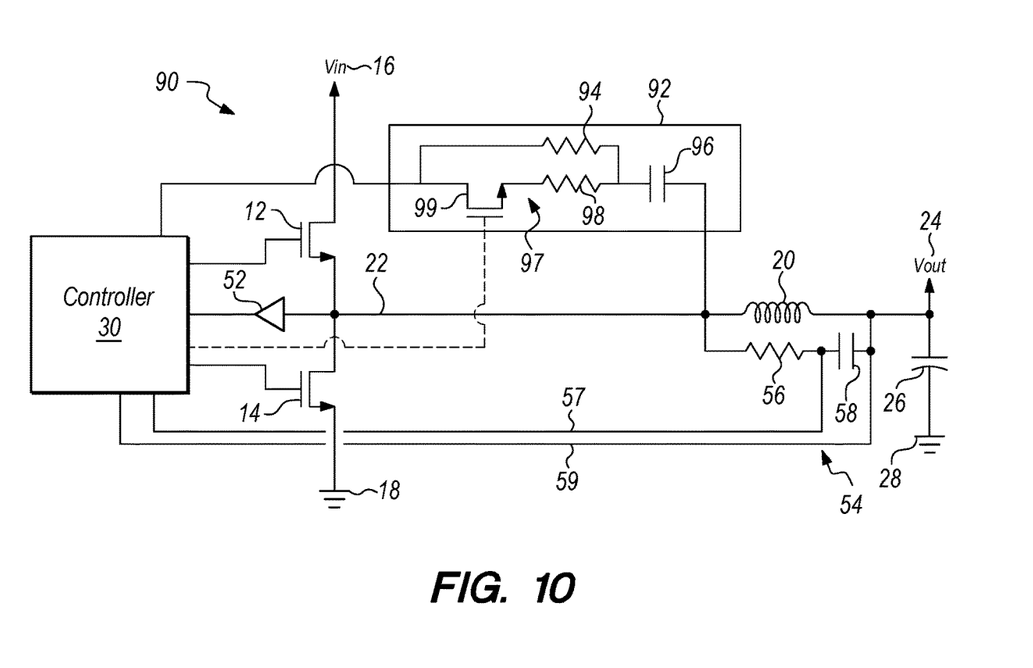
FIG. 10 is a diagram of a single phase buck converter including an attenuation circuit that includes a switchable boost resistor circuit.

FIG. 10 is a diagram of a single phase buck converter 90 including an attenuation circuit 92 including an electronic switch 99. The single phase buck converter 90 is a non-limiting example of a voltage regulator which includes a high-side field-effect transistor 12 and a low-side field-effect transistor 14 connected in series between a voltage input ($V_{in}$) 16 and ground 18. The single phase buck converter 10 further includes an inductor 20 having a first end connected to a conductive net or switching node 22 between the high-side field-effect transistor 12 and the low-side field-effect transistor 14. A second end of the inductor is connected to a voltage output ($V_{out}$) 24, where a capacitor 26 separates the voltage output 24 from ground 28.

The single phase buck converter 90 further includes a controller 30, such as an integrated circuit or "Control IC", which controls the operation of the field-effect transistors 12, 14. Specifically, the controller 30 has a first output in communication with a gate of the high-side field-effect transistor 12 and a second output in communication with a gate of the low-side field effect transistor 14. For example, the controller 30 may operate field-effect transistors 12, 14 in a manner that provides a desired output voltage level at the voltage output ($V_{out}$) 24.

However, when the high-side field-effect transistor 12 of the voltage regulator 90 is switched on, the conductive net 22 rings above the input voltage. To attenuate this ringing, the attenuation circuit 92 is connected between the conductive net 22 and the controller 30. In some embodiments, the attenuation circuit 92 may include a fixed boost resistor 94 in series with a boost capacitor 96 to slow down the turn on time of the high-side field-effect transistor 12. Embodiments further include a switchable boost resistor circuit 97 in parallel with the fixed boost resistor 94, wherein the switchable boost resistor circuit 97 includes a boost resistor 98 and an electronic switch 99. The electronic switch 99 may be a field-effect transistor (FET), a bipolar junction transistor (BJT) or an insulated-gate bipolar transistor (IGBT). One example of a suitable field-effect transistor is a metal-oxide-semiconductor field-effect transistor (MOSFET).

If the attenuation circuit 92 included only the fixed boost resistor 94 in series with the boost capacitor 96, the attenuation circuit 92 would be effective to attenuate ringing in the conductive net by slowing down the high-side field-effect resistor, but would negatively impact the efficiency of the voltage regulator 90. Specifically, the fixed boost resistor 94 may cause a power loss that reduces the voltage regulator's overall efficiency. The switchable boost resistor circuit 97 may be provided in parallel to the fixed boost resistor 94 to improve the efficiency of the voltage regulator 90 through a portion of the load range.

In some embodiments, the voltage in the conductive net 22 may be measured in the same manner described in reference to the voltage comparator 52 of FIG. 3. Accordingly, the output of the voltage comparator 52 is input to the controller 30. In some embodiments, the output current from the voltage regulator may be measured in the same manner described in reference to the DCR current sense circuit 54 in FIG. 4. Accordingly, the output current is input to the controller 30 via the lines 57, 59. Either the voltage measurement or the current measurement may be provided to the controller 30 to determine when to switch the boost resistor bypass on/off. While the voltage comparator and DCR current sense circuits are both shown in FIG. 10, the voltage regulator 90 may include either circuit alone or both of the circuits, although embodiments only need one of the measurements to control the switchable boost resistor circuit 97.

In some embodiments, the switchable boost resistor circuit 97 is turned on or kept on in response to current or voltage measurements being less than a current or voltage threshold, then the switchable boost resistor circuit 97 is turned off in response to the current or voltage measurements exceeding the current or voltage threshold. Accordingly, the effective resistance value of the parallel boost resistors 94, 98 may be increased in response to exceeding a current threshold or a voltage threshold. Accordingly, attenuation is provide when needed as indicated by a current or voltage exceeding the current threshold or voltage threshold, respectively. However, the attenuation is reduced to save power when attenuation is not needed as indicated by a current or voltage being less than the current threshold or voltage threshold, respectively.

In embodiments where the switchable boost resistor 98 has a low resistance value, the switchable boost resistor circuit 97 may be considered to be a bypass circuit around any other boost resistor(s) that is/are in parallel with the switchable boost resistor circuit 97. In other words, the switchable boost resistor circuit 97 may reduce the resistance of the parallel resistors (here, just fixed boost resistor 94) so that less energy is dissipated by the attenuation circuit 92. This power savings is beneficial during periods that there is minimal ringing in the conductive net, such that the function of the boost resistor is not needed.

In addition to outputs in communication with the high-side field-effect transistor 12 and the low-side field-effect transistor 14, the controller 30 may further include an output in communication with the electronic switch 99, such that the controller can turn on and turn off the electronic switch 99. When the electronic switch 99 is turned on, the switchable boost resistor circuit 97 reduces the amount of attenuation provided by the attenuation circuit 92. For example, turning on the electronic switch 99 allows electrical current to flow through resistor 98 in parallel to the fixed boost resistor 94 such that the effective resistance in the attenuation circuit 92 is reduced. However, with the attenuation circuit 92 essentially disabled, less power is dissipated. Accordingly, various embodiments of the controller 30 may keep the switchable boost resistor circuit 97 turned on unless attenuation is needed. Furthermore, output of the attenuation circuit 92 is input to the controller 30. This input is used by the controller 30 to allow the controller or other driver to slow down the turn on time of the high-side field-effect transistor 12.

Where the electronic switch 99 is a field-effect transistor as shown, the controller 30 may turn the field-effect transistor on and off by controlling the voltage to a gate of the field-effect transistor. Although not shown, the controller 30 may include a driver for each of the field-effect transistors 12, 14. Where the electronic switch 99 is a field-effect transistor, the controller 30 may include a further driver in association with the electronic switch 99. Optionally, any of the drivers may be included in the controller 30, on a circuit board that includes the controller, or as discrete components. Accordingly, the drivers are not separately shown. Although FIG. 1 illustrates the buck converter 90, any direct current (DC) converter topology may utilize the attenuation circuit 92 to attenuate voltage spikes on a switching node 22.

The switchable boost resistor circuit 97 may be either a discrete component or integrated with any of the other components. For example, a switchable boost resistor circuit may be integrated into a power stage including the FETs and FET driver, or integrated into a point of load integrated circuit including the FETs, drivers and controller. While FIG. 10 shows only one switchable boost resistor, multiple switchable boost resistors may be used in parallel, with the controller switching one or more of the switchable boost resistors into the attenuation circuit depending on the amount of attenuation desired. While one or more switchable boost resistor circuits 97 may be placed in parallel with a fixed boost resistor 94 as shown, it is also possible to include one or more switchable boost resistor circuit in place of the fixed resistor such that all of the one or more parallel boost resistors are switchable boost resistor circuits.

Some embodiments of the voltage regulator have the capability of switching one or more boost resistor circuits in a plurality of parallel boost resistors in order to reduce or eliminate power loss in the boost resistor circuit over a portion of the efficiency curve. The voltage regulator may measure either the output current from the voltage regulator or the maximum voltage at the conductive net 22 as an input to control switching of the switchable boost resistor(s). For example, the switchable boost resistor may be switched off in response to the voltage in the conductive net exceeding a predefined voltage threshold or in response to the output current exceeding a predefined current threshold.

In a first example, a switchable 0 ohm boost resistor 98 is enabled (the electronic switch 99 is turned on) to bypass the fixed boost resistor 94 over a range of voltage regulator output current from 0-3 Amps. However, in response to the voltage regulator output current exceeding 3 Amps, the switchable 0 ohm boost resistor 98 is disabled (the electronic switch 99 is turned off) such that all of the current must pass through the fixed boost resistor 94 and any other boost resistors in parallel with the boost resistor circuit 97. The other boost resistor(s) may include any parallel fixed boost resistor and any other parallel switchable boost resistor that is enabled.

In a second example, a switchable 0 ohm boost resistor 98 is enabled (the electronic switch 99 is turned on) to bypass a parallel 2 ohm fixed boost resistor 94 and a parallel 2 ohm switchable boost resistor (not shown; same as the switchable boost resistor circuit 97) over a range of voltage regulator output current from 0-3 Amps. However, in response to the voltage regulator have an output current between 3 and 5 Amps, the (first) switchable 0 ohm boost resistor 98 is disabled (the electronic switch 99 is turned off) such that current must pass through the 2 ohm fixed boost resistor 94 and a second 2 ohm switchable boost resistor (not shown). The two parallel 2 ohm boost resistors will have an effective boost resistance of 1 ohm. In response to the voltage regulator output current exceeding 5 Amps, the switchable 0 ohm boost resistor 98 remains disabled (the electronic switch 99 is turned off) and the switchable 2 ohm boost resistor (not shown) is disabled such that all of the current must pass through the fixed 2 ohm boost resistor 94. Having multiple switchable boost resistor circuits 97 in parallel provide for any number of effective boost resistances by disabling/enabling the circuits 97 as needed. Accordingly, the amount of attenuation can be tailored as a function of the current output or voltage measurement values.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:
   a voltage regulator including a high-side field-effect transistor, a low-side field-effect transistor, an inductor, and a conductive net connecting the high-side field-effect transistor, the low-side field-effect transistor and the inductor; and
   an attenuation circuit coupled to the conductive net, wherein the attenuation circuit includes an electronic switch that enables and disables an amount of attenuation provided by the attenuation circuit, wherein the attenuation circuit is a boost resistor circuit connected between the conductive net and a controller that is in communication with a gate of the high-side field-effect transistor, wherein the boost resistor circuit includes a capacitor, a first boost resistor in series with the capacitor, and a switchable boost resistor circuit in parallel with the first boost resistor, and wherein the switchable boost resistor circuit includes the electronic switch.

2. The apparatus of claim 1, wherein the electronic switch prevents power consumption in the attenuation circuit when the amount of attenuation provided by the attenuation circuit is disabled.

3. The apparatus of claim 1, wherein the switchable boost resistor circuit includes the electronic switch and a second boost resistor.

4. The apparatus of claim 1, wherein the electronic switch is selected from a field-effect transistor, a bipolar junction transistor, and an insulated-gate bipolar transistor.

5. The apparatus of claim 1, wherein the controller has a first output in communication with a gate of the high-side field-effect transistor, a second output in communication with a gate of the low-side field-effect transistor, and a third output in communication with the electronic switch.

6. The apparatus of claim 5, further comprising:
   a voltage comparator having a voltage input connected to the conductive net between the high-side field-effect transistor and the low-side field-effect transistor, wherein the voltage comparator has a voltage output in communication with an input to the controller.

7. The apparatus of claim 6, wherein the controller turns on the electronic switch of the switchable boost resistor circuit in response to the voltage signal output exceeding a voltage setpoint, and wherein the controller maintains the electronic switch of the switchable boost resistor circuit in an off condition unless the voltage signal output exceeds the voltage setpoint.

8. The apparatus of claim 7, wherein the switchable boost resistor circuit does not dissipate power while the electronic switch of the switchable boost resistor circuit is turned off.

9. The apparatus of claim 5, further comprising:
a current sense circuit disposed to measure an output current of the voltage regulator and provide the measured output current to an input of the controller, wherein the controller turns on the electronic switch of the switchable boost resistor circuit in response to the measured output current exceeding a current setpoint.

10. The apparatus of claim 9, wherein the current sense circuit is a DCR current sense circuit connected across the inductor, wherein the DCR current sense circuit includes a series resistor and a capacitor coupled in parallel across the inductor, and wherein the DCR current sense circuit includes a pair of current sense leads extending from opposite sides of the capacitor.

11. The apparatus of claim 5, further comprising:
one or more additional boost resistor circuits connected in parallel with the boost resistor circuit, wherein each of the one or more additional boost resistor circuits includes a resistor, a capacitor, and an electronic switch, and wherein the controller has one or more additional outputs, wherein each additional output is in communication with the electronic switch of one of the additional boost resistor circuits.

12. The apparatus of claim 1, wherein the boost resistor circuit is a switchable RC boost resistor circuit.

13. An apparatus, comprising:
a voltage regulator including a plurality of phases, each phase including a high-side field-effect transistor, a low-side field-effect transistor, an inductor, and a conductive net connecting the high-side field-effect transistor, the low-side field-effect transistor and the inductor, wherein each phase further includes an attenuation circuit coupled to the conductive net, wherein the attenuation circuit is a boost resistor circuit connected to the conductive net, wherein the attenuation circuit includes an electronic switch that enables and disables an amount of attenuation provided by the attenuation circuit, wherein the boost resistor circuit includes a capacitor, a first boost resistor in series with the capacitor, and a switchable boost resistor circuit in parallel with the first boost resistor, and wherein the switchable boost resistor circuit includes the electronic switch; and
a multi-phase controller in communication with a gate of the high-side field-effect transistor of each phase, a gate of the low-side field-effect transistor of each phase, and the electronic switch in the switchable boost resistor circuit of each phase, wherein the boost resistor circuit is connected between the conductive net and the multi-phase controller.

14. The apparatus of claim 13, each phase further including a voltage comparator having a voltage input connected to the conductive net between the high-side field-effect transistor and the low-side field-effect transistor of the phase, wherein the voltage comparator has a voltage output in communication with an input to the multi-phase controller, and wherein the multi-phase controller turns on the electronic switch in the switchable boost resistor circuit of the phase in response to the voltage output from the voltage comparator of the phase exceeding a voltage setpoint.

15. The apparatus of claim 13, each phase further including a current sense circuit disposed to measure an output current of the phase and provide the measured output current to an input of the multi-phase controller, wherein the multi-phase controller turns on the electronic switch in the switchable boost resistor circuit of the phase in response to the measured output current from the current sense circuit of the phase exceeding a current setpoint.

16. The apparatus of claim 13, wherein each phase includes a local-phase controller, and wherein the multi-phase controller provides a separate pulse-width modulation signal to each local phase controller.

17. An apparatus, comprising:
a voltage regulator including a plurality of phases, each phase including a high-side field-effect transistor, a low-side field-effect transistor, an inductor, and a conductive net connecting the high-side field-effect transistor, the low-side field-effect transistor and the inductor, wherein each phase further includes an attenuation circuit coupled to the conductive net, wherein the attenuation circuit is a boost resistor circuit connected to the conductive net, wherein the attenuation circuit includes an electronic switch that enables and disables an amount of attenuation provided by the attenuation circuit, wherein the boost resistor circuit includes a capacitor, a first boost resistor in series with the capacitor, and a switchable boost resistor circuit in parallel with the first boost resistor, and wherein the switchable boost resistor circuit includes the electronic switch;
a plurality of local-phase controllers, each phase including one of the local-phase controllers in communication with a gate of the high-side field-effect transistor of the phase, a gate of the low-side field-effect transistor of the phase, and the electronic switch in the boost resistor circuit of the phase, wherein the boost resistor circuit in each phase is connected between the conductive net and the local-phase controller of the phase; and
a multi-phase controller in communication with each local-phase controller for providing a separate pulse-width modulation signal to each local-phase controller.

18. The apparatus of claim 17, each phase further including a voltage comparator having a voltage input connected to the conductive net between the high-side field-effect transistor and the low-side field-effect transistor of the phase, wherein the voltage comparator of each phase has a voltage output in communication with an input to the local-phase controller of the phase, and wherein the local-phase controller of each phase is in communication with the electronic switch in the switchable boost resistor circuit of the phase for turning on the electronic switch in response to the voltage output from the voltage comparator of the phase exceeding a voltage setpoint.

19. The apparatus of claim 17, each phase further including a current sense circuit disposed to measure an output current of the phase and provide the measured output current to an input of the local-phase controller of the phase, wherein the local-phase controller of each phase is in communication with the electronic switch in the switchable boost resistor circuit of the phase for turning on the electronic switch in response to the measured output current from the current sense circuit of the phase exceeding a current setpoint.

* * * * *